United States Patent [19]

Mortimer

[11] Patent Number: 4,779,710

[45] Date of Patent: Oct. 25, 1988

[54] HYDRAULIC ANTI-SKID BRAKING SYSTEM FOR VEHICLE WITH MODULATOR, LEVER, FULCRUM AND DEGREE OF LOST-MOTION

[75] Inventor: Ivan Mortimer, West Midlands, England

[73] Assignee: Lucas Industries public limited company, England

[21] Appl. No.: 77,792

[22] Filed: Jul. 27, 1987

[30] Foreign Application Priority Data

Jul. 31, 1986 [GB] United Kingdom ............... 8618674

[51] Int. Cl.[4] .......................... B60T 8/42; B60T 13/70
[52] U.S. Cl. .............................. 188/181 A; 303/115; 303/116
[58] Field of Search .................. 188/181 A, 181 R; 303/115, 117, 119, 116, 61–63, 68–69, 110

[56] References Cited

U.S. PATENT DOCUMENTS

| | | | |
|---|---|---|---|
| 4,353,440 | 10/1982 | Farr | 188/181 A |
| 4,377,221 | 3/1983 | Farr | 188/181 A |
| 4,602,705 | 7/1986 | Farr et al. | 188/181 A |
| 4,606,585 | 8/1986 | Farr et al. | 303/115 X |
| 4,714,301 | 12/1987 | Farr | 303/115 X |

Primary Examiner—Douglas C. Butler
Attorney, Agent, or Firm—Laff, Whitesel, Conte & Saret

[57] ABSTRACT

In an anti-skid modulator assembly a flywheel mechanism operates a dump valve through a lever which is adapted to pivot about a fulcrum at an intermediate point in its length. The dump valve comprises a spring normally urging a valve member into engagement with a seating. The valve member has a head at its outer end with which the lever co-operates to open the dump valve. Normally when the dump valve is closed, the lever is in engagement with the fulcrum and is spaced from the head by a degree of lost-motion.

3 Claims, 3 Drawing Sheets

HYDRAULIC ANTI-SKID BRAKING SYSTEM FOR VEHICLE WITH MODULATOR, LEVER, FULCRUM AND DEGREE OF LOST-MOTION

This invention relates to hydraulic anti-skid braking systems for vehicles of the kind in which a supply of operating fluid from a supply, suitably an hydraulic master cylinder, to a brake is modulated in accordance with signals from a flywheel mechanism driven from a wheel to be braked by the brake and a dump valve operable by the flywheel mechanism is operative to initiate release of fluid applied to the brake when a skid signal is present, brake re-application means being provided to control brake re-application following correction of a skid.

In some known hydraulic anti-skid braking systems of the kind set forth, the dump valve comprises an unsprung valve member which, in a closed position of the dump valve, is held in engagement with a seating by means of a lever with which the flywheel mechanism co-operates and, when the flywheel mechanism emits a skid signal, the lever pivots about a fulcrum at an intermediate point in its length to permit the valve member to move away from the seating to dump fluid to a reservoir, thereby to initiate release of fluid applied to the brake.

In such a known construction, when no skid signal is present, there is a clearance, or a degree of lost-motion is provided, between the lever and the fulcrum so that a positive closing force is applied from the flywheel mechanism to the valve member through the lever.

The clearance or lost motion which is provided between the fulcrum and the lever also ensures that the dump valve is not activated unless a positive skid signal is detected by the flywheel mechanism.

The manufacturing problems associated with producing a flywheel assembly as used in a mechanical modulator, such as design tolerances and squareness, means that at angular velocities of the flywheel associated with normal road usage of a motor vehicle high frequency vibrations will be set up in the flywheel mechanism.

In the particular usage of such a modulator on the front wheel of a motor cycle where the modulator encircles the axle the vibrational problems associated with an "out of balance" flywheel may be further accentuated by the components of the flywheel being spaced radially further from the centre of rotation to accommodate the front wheel axle.

Such high frequency vibrations of the flywheel are transmitted through the lever mechanism directly to the dump valve and its associated valve seating. High frequency vibrations at the valve seating are obviously detrimental to the functioning of the modulator as they cause leakage at the dump valve seat and also damage to the seating face.

According to our invention, in an hydraulic anti-skid braking system of the kind set forth the flywheel mechanism operates the dump valve through a lever adapted to pivot about a fulcrum at an intermediate point in its length, and the dump valve comprises a valve seating, a valve member for engagement with the seating, a spring for urging the valve member into engagement with the seating to define a closed position for the dump valve, and a head on the valve member with which the lever is adapted to co-operate to urge the valve member away from the seating and into an open position in response to a skid signal, the lever being in engagement with the fulcrum and the lever being spaced from the head by a degree of lost-motion when the dump valve is in the closed position.

The lost motion is provided in the position between the dump valve and the lever to ensure that high frequency vibrations of the flywheel mechanism cannot under normal conditions be transmitted to the dump valve member.

Preferably the spring comprises a compression spring which acts between a shoulder on the valve member and a shoulder on a housing through which the valve member projects, and the head is carried by the outer end of a stem of reduced diameter at the outer end of the valve member, the lever incorporating an opening in which the stem is received with the lever normally spaced between the head and the outer end of the valve member.

Conveniently the lever acts as a lever of the first order with the flywheel mechanism and the dump valve co-operating with parts of the lever on opposite sides of the fulcrum, and a spring acts on the end of the lever remote from the dump valve normally to urge the lever into engagement with the flywheel mechanism, and also into engagement with the fulcrum when the dump valve is in the closed position.

One embodiment of our invention is illustrated in the accompanying drawings in which.

Figure 1:
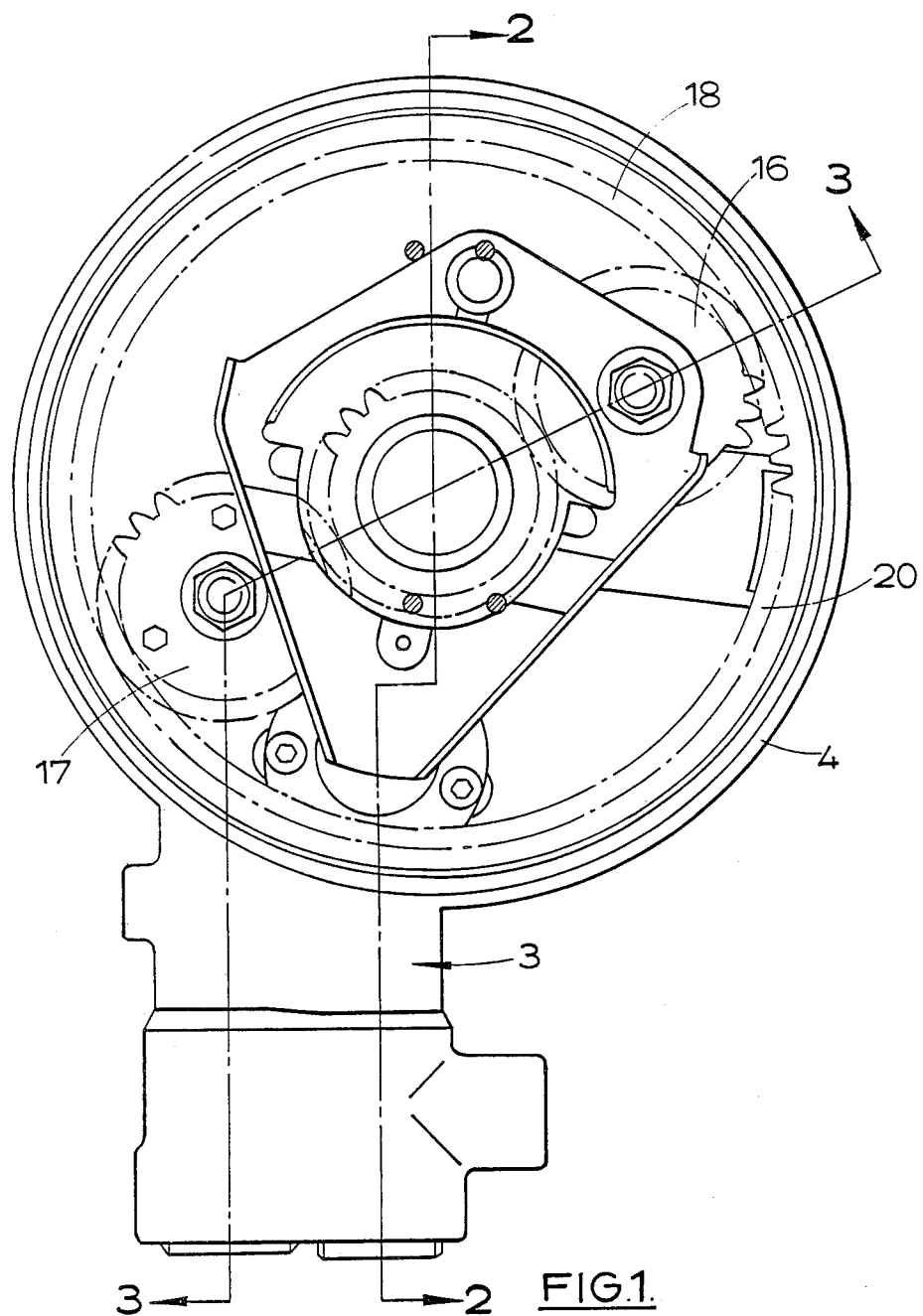
FIG. 1 is an end view of a modulator assembly for an anti-skid hydraulic braking system for a vehicle.
Figure 2:
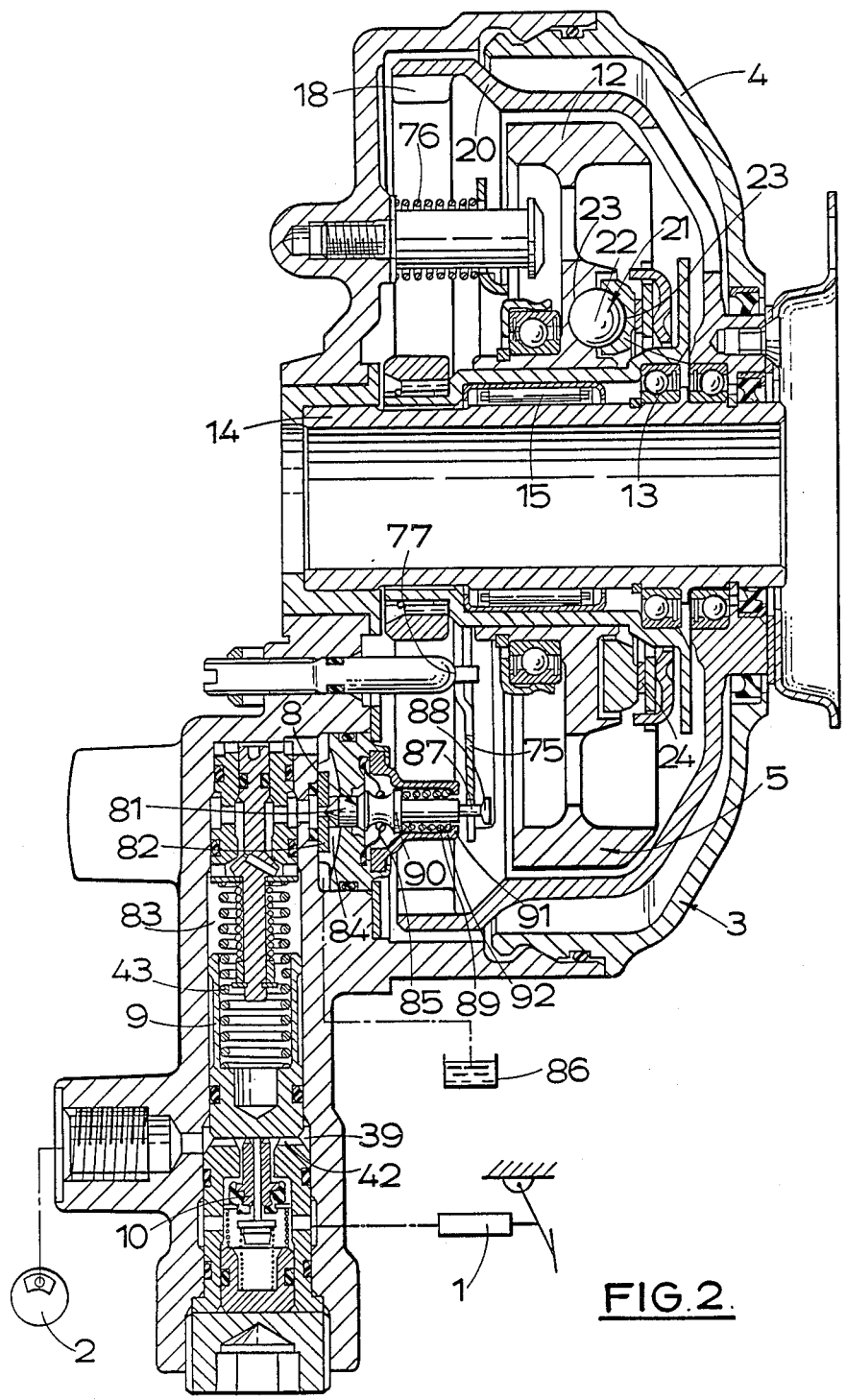
FIG. 2 is a section on the line 2—2 of FIG. 1.
Figure 3:
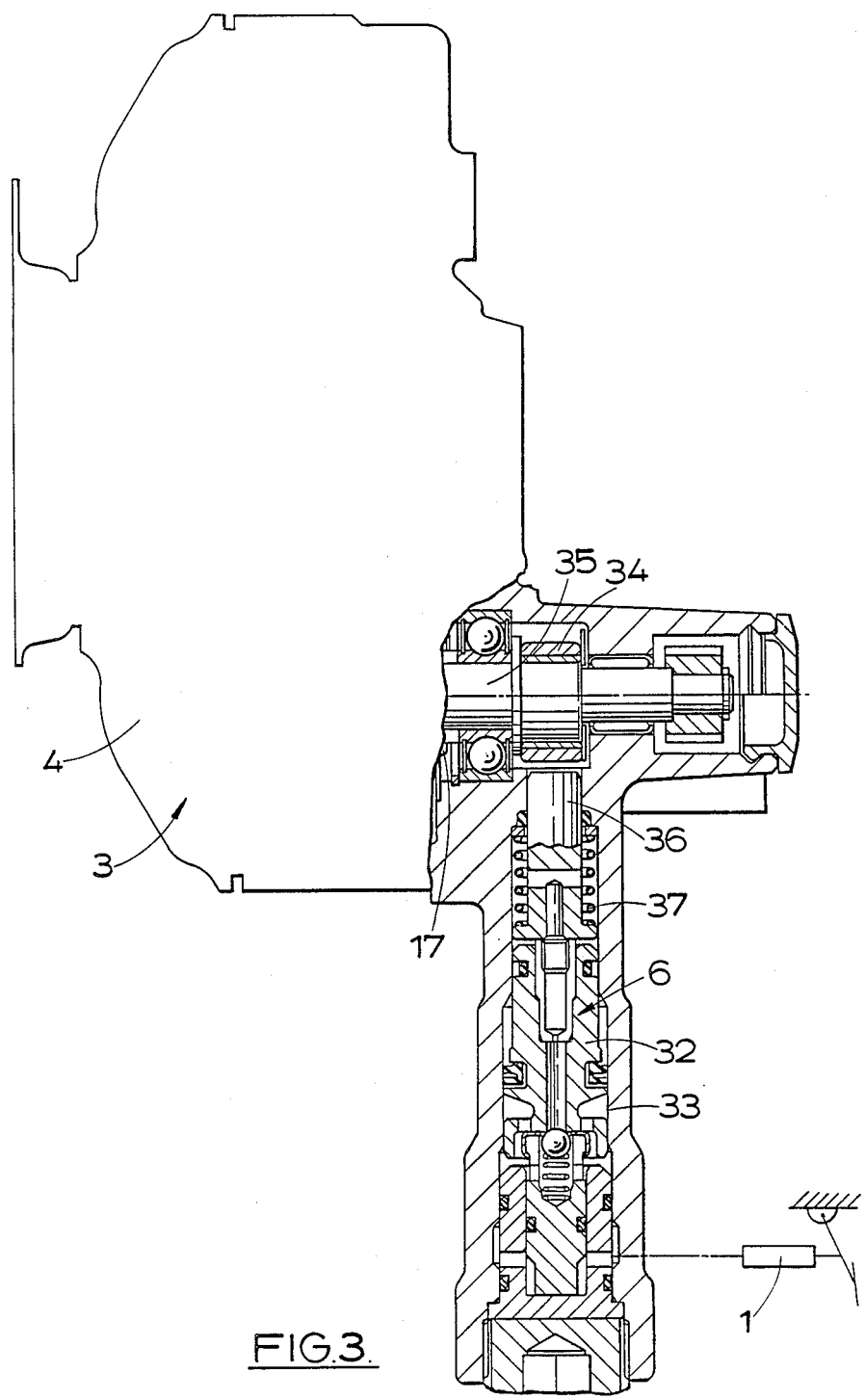
FIG. 3 is a section on the line 3—3 of FIG. 1.

The anti-skid braking system illustrated in the drawings comprises a pedal-operated hydraulic master cylinder 1 for operating a wheel brake 2, and a modulator assembly 3.

The modulator assembly 3 comprises a casing 4 in which is incorporated a flywheel mechanism 5, a pump 6, a dump valve 8, an expander piston 9, and an isolating valve 10.

The flywheel mechanism 5 comprises a flywheel 12, which is rotatably located by spaced bearings 13 and 15 and a ball and ramp mechanism 21. The mechanism 5 encircles a hollow stationary shaft 14 through which extends a shaft (not shown) rotatable with a wheel to be braked by the brake 2, and in the hub of which the modulator is installed. A reaction member 19 journalled on the shaft 14 is driven from the wheel through idler pinions 16, 17, and internal teeth 18 on a flange 20 rotatable with the wheel.

The ball and ramp mechanism 21 comprises balls 22, suitably three in number, which are housed in angularly spaced recesses 23 of complementary outline in adjacent faces of the flywheel 12 and the reaction member 19. The edges of the recesses 23 define ramps up which the balls 22 are adapted to ride upon relative rotation between the flywheel 12 and the reaction member 19, with the flywheel 12 moving substantially simultaneously axially away from the reaction member 19.

A clutch 24 is located between relatively movable parts of the reaction member 19. The flywheel 12 is therefore driven from the reaction member through the clutch 24.

The pump 6 comprises a plunger 32 which is housed in a longitudinal bore 33 of stepped outline in the casing 4. The inner end of the plunger 32 works through the portion of the bore 33 which is of smallest diameter. A tappet 36 for operating the plunger is held away from an eccentric drive portion 34 on a shaft 35 by a compression spring 37, and the shaft 35 is driven from the pinion 17.

An expander chamber 39 is defined in a bore between the expander piston 9 and the valve 10. The expander piston 9 is normally urged into engagement with a shoulder 42 by means of a compression spring 43 and in this position, the effective volume of the chamber 39 is at a minimum.

The dump valve 8 is operated by a lever 75 with which the flywheel mechanism 5 is adapted to co-operate. As illustrated, the lever 75 co-operates with the end of the flywheel 12 which is remote from the reaction member 19. The lever 75 is biassed towards the flywheel 12 by means of a compression spring 76 which acts on one end of the lever 75 in turn to urge a portion of the lever 75 into engagement with a fulcrum 77 on the housing.

The dump valve 8 comprises a valve member 81 engageable with a seating 82 surrounding a port which communicates at its opposite inner end with a support chamber 83 in which the spring 43 is housed. The valve member 81 comprises a piston guided to slide in a bore between the port and mounted on a diaphragm 85 which seals the valve member 81 in the bore. A chamber 84 between the port and the piston is connected to a reservoir 86. The piston includes a stem 87 of reduced diameter with an enlarged head 88 being carried by its outer end.

In a closed position the valve member 81 is urged into engagement with the seating 82 by means of a compression spring 89 which surrounds a portion of the piston 81 on the outer side of the diaphragm 85 and is caged between complementary shoulders 90 and 91 on the piston and in a casing 92 in which the valve member 81 is housed. This isolates the port from the reservoir 86.

A bifurcated portion 92 at the free end of the lever 75 remote from the spring 76 receives the stem 87 so that the lever is disposed between the piston and the head 88. Normally the lever 75 is spaced therebetween so that any high frequency vibrations of the flywheel 12 will not be transmitted to the valve member 81 due to the lost-motion between the lever 75 and the head 88. Therefore no vibrational movement of the valve member 81 relative to the seating 82 will occur.

When the master cylinder 1 is operated to apply the brake 2, fluid under pressure flows to the brake 2 through the open isolating valve 10.

Under such conditions the shaft 35 rotates freely with the tappet 36 urged out of co-operation with the eccentric 34 by means of the spring 35. The flywheel assembly 5 rotates, being driven by the clutch 24, and the flywheel 12 and the reaction member 19 both rotate together due to the location of the balls 22 in the recesses 23.

Normal decelerations of the braked wheel will not cause the flywheel 12 to generate a torque sufficient to overcome the force in the spring 76. However, should the braked wheel pass onto a slippery surface, the braked wheel will decelerate rapidly accompanied by a similar deceleration of the flange 18 and the reaction member 19. Due to its inertia the flywheel 12 will continue to rotate at a greater speed, and the torque thus generated causes the balls 22 to ride up the ramps defined by the recesses 23, overcoming the load in the spring 76 and with the relative angular movement of the flywheel 12 and the reaction member 19 being accompanied by axial movement of the flywheel 12 away from the reaction member 19. At the extent of the movement of the balls 22 up the ramps, the flywheel 12 and the reaction member 19 are in an expanded condition and both overrun relative to the shaft 14 with the clutch 24 slipping. Expansion of the flywheel mechanism 5 applies a force to the lever 75, causing it to pivot about the fulcrum 77. This action opens the dump valve 8 by the lever 75 taking up the lost-motion to engage the head 88 and withdraw the valve member 81 away from the seating 82 against the force in the compression spring 89.

Opening the dump valve 8 returns fluid to the reservoir 86 from the chamber 83. This enables the expander piston 9 to retract, in turn permitting the isolating valve 10 to close and increasing the volume of the chamber 39 which relieves the pressure applied to the brake 2. In addition the plunger 32 is unbalanced since the pumping chamber is in communication with the chamber 83. Thus the tappet 36 is permitted to move towards the cam 34, whereby operation of the pump 6 is initiated. Thereafter the plunger 32 oscillates to draw fluid from the reservoir 86 and pump it back into the chamber 83.

When the speed of the roadwheel recovers at the termination of the skid following brake release, the flange 20 accelerates and, on reaching the speed of the flywheel 12, the flywheel mechanism 5 contracts, with the balls 22 running down the ramps. This movement of the flywheel mechanism 5 is accompanied by a corresponding movement of the lever 75 about the fulcrum 77 to permit the dump valve 8 to close, signifying the termination of the skid signal, and the lever 75 returns to the initial position with the degree of lost-motion re-established. The brake 2 is thereafter re-applied by the flow of fluid from the pump 6 which advances the expander piston 9 in its bore to supply pressure fluid to the brakes.

I claim:

1. An hydraulic anti-skid braking system for vehicles having a wheel to be braked, comprising a supply of operating fluid, a brake for braking the wheel and adapted to be operated by fluid from said supply, a flywheel mechanism driven from said wheel and adapted to emit skid signals, a dump valve disposed in a housing and movable between an open position and a closed position, said dump valve being operable by said flywheel mechanism to initiate release of fluid applied to said brake when a skid signal is present, brake re-application means for controlling re-application of said brake following correction of a skid, a lever through which said flywheel mechanism acts to operate said dump valve, a fulcrum about which said lever is adapted to pivot at an intermediate point in the length thereof, wherein said dump valve comprises a valve member, a valve seating, a shoulder on said housing through which said valve member projects, a shoulder on said valve member, a spring acting between said shoulders to urge said valve member into engagement with said seating to define said closed position for said dump valve, an extension on said valve member having a free end, an enlarged head on said free end of said extension, said lever having a force-transmitting portion located between said valve member and said head, said force-transmitting portion being spaced from said head by a degree of lost-motion when said dump valve is in said closed position and said lever is in engagement with said fulcrum, and means defining an engagement between said force-transmitting portion and said head to urge said valve member away from said seating against the force in said spring when said lever pivots about said fulcrum in response to a skid signal.

2. A system as claimed in claim 1, wherein said spring comprises a compression spring which acts between said shoulders, and said lever incorporates an opening in which said stem is received with said lever normally spaced between said head and said outer end of said valve member.

3. A system as claimed in claim 1, wherein said lever acts as a lever of the first order with said flywheel mechanism and said dump valve co-operating with parts of said lever on opposite sides of said fulcrum, and a spring acts on an end of said lever remote from said dump valve normally to urge said lever into engagement with said flywheel mechanism, and also into engagement with said fulcrum when said dump valve is in said closed position.

* * * * *